(12) United States Patent
Lee et al.

(10) Patent No.: US 10,848,688 B1
(45) Date of Patent: Nov. 24, 2020

(54) INSPECTION SYSTEM FOR LOCATING A LOST OBJECT FALLEN FROM A CONVEYOR BELT

(71) Applicant: Deutsche Post AG, Bonn (DE)

(72) Inventors: Kelvin Soon Huat Lee, Singapore (SG); Edilberto Sahagun, Singapore (SG); Keng Hing Soong, Singapore (SG)

(73) Assignee: DEUTSCHE POST AG, Bonn (DE)

( * ) Notice: Subject to any disclaimer, the term of this patent is extended or adjusted under 35 U.S.C. 154(b) by 0 days.

(21) Appl. No.: 16/539,003

(22) Filed: Aug. 13, 2019

(51) Int. Cl.
*H04N 5/28* (2006.01)
*H04N 5/225* (2006.01)
*B65G 43/00* (2006.01)

(52) U.S. Cl.
CPC ............. *H04N 5/28* (2013.01); *B65G 43/00* (2013.01); *H04N 5/2253* (2013.01); *H04N 5/2256* (2013.01); *B65G 2203/041* (2013.01)

(58) Field of Classification Search
CPC .... B65G 2203/041; B65G 43/00; H04N 5/28; H04N 5/2253; H04N 5/2256
See application file for complete search history.

(56) References Cited

U.S. PATENT DOCUMENTS

| | | | |
|---|---|---|---|
| 7,922,329 B1* | 4/2011 | Graether | A61B 3/135 351/205 |
| 2003/0144103 A1* | 7/2003 | Battat | B29O 66/4324 474/254 |
| 2003/0168317 A1 | 9/2003 | Fromme et al. | |
| 2018/0121470 A1* | 5/2018 | Grossman | G06F 16/5866 |
| 2020/0021742 A1* | 1/2020 | Deng | G06K 9/00771 |

* cited by examiner

*Primary Examiner* — Anner N Holder
(74) *Attorney, Agent, or Firm* — Dority & Manning, P.A.

(57) ABSTRACT

An inspection system for locating a lost object fallen from a conveyor belt includes a conveyor belt, a camera and a data processing device. The conveyor belt is configured for moving the object placed on the conveyor belt. The camera is configured for being arranged on the conveyor belt, for capturing an image of a surrounding of the conveyor belt while being moved by the conveyor belt, and for transmitting the captured image to the data processing device for recognizing the lost object in the transmitted image.

12 Claims, 3 Drawing Sheets

INSPECTION SYSTEM FOR LOCATING A LOST OBJECT FALLEN FROM A CONVEYOR BELT

TECHNICAL FIELD

The invention relates generally to an inspection system for locating a lost object fallen from a conveyor belt, including a conveyor belt, a camera and a data processing device, wherein the conveyor belt is configured for moving the object placed on the conveyor belt.

BACKGROUND

Modern logistics sector relies heavily on conveyor belt systems for transporting objects. The conveyor belt system of a typical logistic operator may have many belts forming a complex network for fast and easy transportation of objects. Generally, it is possible that parts of the conveyor belt system may not work in an optimum fashion. Therefore monitoring systems that monitor for example the speed of the conveyor belt may be used.

US 2003/0168317 A1 describes a systems and techniques for detecting and reporting conditions of a conveyor belt by receiving image data from at least one camera structured and arranged to capture an image of a portion of a conveyor belt, detecting an object in the portion of the conveyor belt based on the received image data, and generating status information associated with the portion of the conveyor belt based on the detected object.

However, occasionally an object that is supposed to be transported by the conveyor belt system may fall off the belt. Such an object may not be detected by conventional conveyor belt monitoring systems. Manual searching for the lost object by personnel may be troublesome, dangerous for the involved personnel, time consuming and cost demanding. Accordingly, there is a need for an inspection system for a conveyor belt, to help locating an object fallen from the conveyor belt.

SUMMARY OF THE INVENTION

It is an example object of the invention to provide an inspection system and a method for locating an object fallen from a conveyor belt.

Thus, the object is solved by an inspection system for locating a lost object fallen from a conveyor belt, including a conveyor belt, a camera and a data processing device, wherein the conveyor belt is configured for moving the object placed on the conveyor belt. The camera is configured for being arranged on the conveyor belt, for capturing an image of a surrounding of the conveyor belt while being moved by the conveyor belt, and for transmitting the captured image to the data processing device for recognizing the lost object in the transmitted image.

The inspection system uses the camera configured to move along with the conveyor belt. In other words the camera is not static. Therefore, by moving the camera along with the conveyor belt, the camera may monitor more of the surrounding compared to a static camera that monitors only a section of the surrounding. Furthermore, the camera may not only be directed at the conveyor belt itself but also at the surrounding of the conveyor belt. However, the surrounding of the conveyor belt may also include the conveyor belt.

In general, any object may be transported on the conveyor belt. However, it may also be possible that the conveyor belt is specifically designed to transport objects of a certain kind, e.g. parcels. Preferably, the conveyor belt is configured to transport packages, courier packs and/or flyer bags. Courier packs and/or flyer bags are mainly used for the secure movement of documents and consignments. Therefore courier packs and/or flyer bags may be manufactured by a light flexible material e.g. plastic. The light weightiness and flexibility enhances the risk for these kinds of objects to fall off the conveyor belt.

Since the object that is supposed to be transported on the conveyor belt has fallen off the conveyor belt, it is not located and respectively transported on the conveyor belt anymore. Instead the object may be located beside and/or below the conveyor belt but still in the surrounding of the conveyor belt. However, the location where the object has fallen off the conveyor belt may not be known. Therefore, the object is considered to be lost. By using the camera which is moved along with the conveyor belt and which captures an image of a surrounding of the conveyor belt while being moved by the conveyor belt it is possible to detect the lost object that has fallen off the conveyor belt.

The conveyor belt is configured for moving the object placed on the conveyor belt. In other words the object may be placed on the conveyor belt for being moved and transported by the conveyor belt. On this account, the conveyor belt may include a motor for moving the conveyor belt. Furthermore, the construction of the conveyor belt may vary according to different transportation requirements. For example the conveyor belt may include one single belt that is moved by two or more conveyor pulleys. Alternatively, the conveyor belt may include several elements attached to each other that form the conveyor belt. It may be possible that the individual elements each include rolls and/or wheels that are guided by a guiding rail. Furthermore the individual elements of the conveyor belt may be attached to a drive train for being moved. As drive train a chain may be used.

The camera is configured for capturing an image of the surrounding of the conveyor belt while being moved by the conveyor belt. The camera may capture intermittingly a single image, for example after a predetermined period of time. Preferably the camera captures a series of images as a video. It may be possible that the camera forms an image using visible light. It may further be possible that the camera forms a heat zone image using infrared radiation or the camera may use any other source of radiation for forming the image. Furthermore, the camera is configured for transmitting the captured image to the data processing device. Preferably, the camera may transmit the captured image without a time delay of more than 5 seconds to the data processing device, more preferably the camera may transmit the captured image to the data processing device instantaneously. Furthermore, the camera may transmit the captured image while it is moving along with the conveyor belt. More preferably, the transmitted image is used for a live streaming of the captured image on the data processing device.

In general, the data processing device may be next to the camera and move along with the camera on the conveyor belt. However, preferably, the data processing device is distant to the camera and is not placed on the conveyor belt. More preferably, the data processing device is static. The image captured by the camera may be transmitted to the data processing device wirelessly. In the transmitted image, the lost object may be recognized.

The data processing device may be a computer, a smartphone, a tablet computer, a server, or any other device that is able to be instructed to carry out a sequence of arithmetic or logical operations automatically via computer programming. Preferably, the data processing device has a display or is connectable to a display for displaying the captured image.

It is therefore a key point of the invention that the camera is moved by the conveyor belt and that the camera captures the image of a surrounding of the conveyor belt while being moved by the conveyor belt. By transmitting the captured image to the data processing device the lost object may be conveniently recognized in the transmitted image. The inspection system may replace manual searching for the lost object by personnel. Therefore, the inspection system saves time and costs, and relieves the personnel from the potentially dangerous, troublesome, and time consuming manual searching. Hence, the safety for the personnel is increased.

In a preferred example implementation of the invention, the camera may be configured for determining the position where the image is captured and for transmitting the determined position to the data processing device. It may be possible that the camera determines its own current position while capturing the image. For example, the camera may include a GPS receiver. Furthermore, the camera may include any known receiver and/or transmitter for an indoor navigational system for determining its location. Further, the camera may be connected to a wireless network and may determine its position due to a signal strength of the wireless signal. Other possibilities for determining the position of the camera may be possible. For example, the camera may include an RFID tag and several RFID readers may be installed along the track of the conveyer belt to determine the position of the camera. Furthermore, it is possible that the position where the image is captured may be determined by considering the captured image. The camera may be configured for transmitting the determined position to the data processing device. Preferably, the determined position is linked to the captured image and transmitted together with the captured image to the data processing device. Determining the position where the image is captured facilitates locating the lost object. The location of the lost object may be determined by recognizing the lost object on the captured image and by using the position where said image was captured.

In order to facilitate locating the object fallen from a conveyor belt, the conveyor belt may include a removable section and the surrounding may include the surrounding visible by the camera through the removed section. In other words the conveyor belt may be configured such that a section of the conveyor belt is removable or displaceable without diminishing the ability of the conveyor belt to move. For example a section of the conveyor belt may be pushed aside parallel to the direction of movement of the conveyor belt in a collapsible fashion. By removing and/or displacing this removable section of the conveyor belt a part of the surrounding may become visible for the camera that normally would be hidden by the conveyor belt. For example, normally the part of the surrounding that is below the conveyor belt may not be visible to the camera but may be covered by the conveyor belt itself. Therefore, if the object has fallen off the conveyor belt and has landed below the conveyor belt, it would not be possible to locate that object on the image captured by the camera. By removing the removable section of the conveyor belt, the surrounding below the conveyor belt becomes visible to the camera. Therefore the object that has landed below the conveyor belt, can be detect on the image captured by the camera. In other words, removing the removable section of the conveyor belt opens up a hole through which an enlarged part of the surrounding of the conveyor belt is visible to the camera.

In general, it is possible that the lost object may be recognized on the transmitted image by looking at the transmitted image. For example, personnel may monitor the video that is transmitted to the data processing device. However, according to a preferred example implementation of the invention, the data processing device may be configured for automatically recognizing the lost object in the transmitted image and/or the data processing device may be configured for recognizing the lost object by using machine learning and/or artificial intelligence. This may be a convenient way for automatically detecting the lost object in the transmitted image. For example, image recognition software may be used that is specifically trained on the kind of object that is transported on the conveyor belt. A neural network may be applied. For example, if courier packs and/or flyer bags, which are colored in a flashy or distinctive color, are transported by the conveyor belt, the machine learning and/or artificial intelligence may be trained on the flashy color of the courier packs and/or flyer bags.

According to a further preferred example implementation of the invention, the data processing device may be configured for generating status information about the lost object from the transmitted image and/or the determined position. As already mentioned above, the captured image is transmitted to the data processing device for recognizing the lost object. Furthermore, the determined position may be transmitted to the data processing device as well. This information may be used to generate status information about the lost object. For example the status information may include the information that the lost object is detected and the position of detected object. Furthermore, if the conveyor belt usually transports different kind of objects, the status information may also include information about the kind of object that is detected. The status information may help retrieving the lost object by specifying the exact location.

As already mentioned, the lost object may be recognized on the transmitted image that is captured by the camera. Therefore, a high quality image may help recognizing the lost object. In this context, according to a preferred example implementation of the invention, the camera may also comprises at least one lighting or light emitter. By the at least one lightening, the quality of the transmitted image may be enhanced. Therefore, it may be easier to recognize the lost object in the transmitted image. The at least one lightening may be a light emitting diode (LED). Preferably there may be two LEDs on each side on the camera to have a high illumination level of the surrounding that is captured by the camera. LEDs may have the advantageous that they have a high light intensity while still having low power consumption.

As explained before, the camera is configured for being arranged on the conveyor belt. In order to be arranged on the conveyor belt, the camera may include a rig for stationary arranging the camera on the conveyor belt. Therefore, the camera may be securely moved by the conveyor belt. The rig may have a form that offers high stability. For example, the rig may have a quadrangular shaped form. It may be possible that the rig is placed on conveyor belt. Alternatively or additionally, the rig may be attached to conveyor belt by a mechanical connecting piece. It may also be possible that the rig allows a lens of the camera to be positioned elevated above the conveyor belt. Therefore, the lens may be positioned in such a fashion that the camera is able to capture a wider part of the surrounding of the conveyor belt.

In this context, according to a further preferred example implementation of the invention, the camera may include a length adjustable and/or pivotable arm for adjusting the field of view of the camera. The length adjustable and/or pivotable arm may allow adjusting the field of view of camera to the specific surrounding of the conveyor belt. For example, the lens of the camera may be positioned elevated above the conveyor belt at a specific angel to the conveyor belt in order to capture the surrounding of the conveyor belt that is beside and below the conveyor belt. It may also be possible that for example a fish eye lens may be used to further adjust the field of view of the camera to the surrounding of the conveyor belt.

With regard to further example advantages and technical features of the inspection system, it is referred to the method for locating a lost object fallen from a conveyor belt, the figures and the further description.

The object is further solved by a method for locating a lost object fallen from a conveyor belt, including:
  arranging a camera on the conveyor belt;
  capturing an image of a surrounding of the conveyor belt with the camera while moving the conveyor belt;
  transmitting the captured image from the camera to a data processing device arranged distant or remote to the camera; and
  recognizing the lost object in the transmitted image on the data processing device.

The method for locating the lost object includes arranging the camera on the conveyor belt and therefore moving the camera along with the conveyor belt. Hence the camera captures an image of the surrounding of the conveyor belt while being moved with the conveyor belt. Therefore, the camera may monitor more of the surrounding compared to a static camera that monitors only a section of the surrounding. By transmitting the captured image to the data processing device, the lost object may be conveniently recognized in the transmitted image. The data processing device is arranged distant to the camera to facilitate the recognition of the lost object in the transmitted image on the data processing device. Therefore, the method for locating the lost object fallen from the conveyor belt, may replace manual searching for the lost object by personnel. Hence using this method relieves the personnel from the potentially dangerous, troublesome, and time consuming manual searching and therefore saves costs. The method may be performed with the above described inspection system for locating the lost object fallen from the conveyor belt. Furthermore, at least one, some or all of the above method steps may be a computer implemented method step respectively carried out as computer implemented method. Furthermore, at least one of the above method steps may be carried out on the data processing device.

According to a preferred implementation the method may further includes
  removing a section of the conveyor belt next to the camera, wherein the surrounding includes the surrounding visible by the camera through the removed section.

The conveyor belt may be configured such that a section of the conveyor belt is removable or displaceable without diminishing the ability of the conveyor belt to move. By removing the section of the conveyor belt that is next to the camera, a part of the surrounding may become visible to the camera that normally would be hidden by the conveyor belt. In other words, removing the section of the conveyor belt opens up a hole through which an enlarged part of the surrounding of the conveyor belt is visible to the camera. For example, normally the part of the surrounding that is below the conveyor belt may not be visible to the camera but may be covered by the conveyor belt itself. Therefore, if the object has fallen off the conveyor belt and has landed below the conveyor belt, it would not be possible to locate that object on the image captured by the camera. By removing the section of the conveyor belt next to the camera, the surrounding below the conveyor belt becomes visible to the camera through the removed section. It may also be possible that in a first step of the method any section of the conveyor belt is removed and in a consecutive step the camera is arranged next to the removed section on the conveyor belt. Either way the surrounding below the conveyor belt becomes visible to the camera. Therefore the object that has landed below the conveyor belt, can be detect on the image captured by the camera.

To further facilitate the locating of the lost object the method may further include:
  determining the position where the image is captured; and
  transmitting the determined position to the data processing device.

As already described above, it may be possible that the camera determines the position where the image is captured by determining its own current position while capturing the image. The camera may determine the position where the image is captured by a GPS receiver. Furthermore, it is possible that the position where the image is captured may be determined by considering the captured image. The determined position may be transmitted to the data processing device. Therefore, this information may be used to locate the lost object.

In general, it is possible that the lost object may be recognized on the transmitted image by looking at the transmitted image. For example, personnel may monitor the video that is transmitted to the data processing device. However, in context of recognizing the lost object on the captured image and according to another preferred example implementation of the invention, the data processing device may recognize the lost object and/or the data processing device may recognize the lost object by using machine learning and/or artificial intelligence. Image recognition software may be used to recognize the lost object on the transmitted image. The data processing device may automatically recognize the lost object in the transmitted image. This may be a convenient way for automatically detecting the lost object in the transmitted image. For example, image recognition software may be used that is specifically trained on the kind of object that is transported on the conveyor belt.

According to the above the method may further include
  generating status information of the lost object from the transmitted image and/or the determined position.

Preferably, status information is generated automatically from the transmitted image and/or from the determined position. For example, the location of the lost object may be determined by recognizing the lost object on the captured image by machine learning and by using the position where said image was captured. This information may be used to automatically generate status information for the lost object. For example, the status information may include the information that the lost object is detected and the position of detected object. Furthermore, if the conveyor belt usually transports different kind of objects the status information may also include information about the kind of object that is detected. The status information may help retrieving the lost object by specifying the exact location.

With regard to further advantages and technical features of the method for locating a lost object fallen from a conveyor belt, it is referred to the inspection system, the figures and the further description.

To summarize the above, example aspects of the present invention solve an important object of how to locate an object fallen from a conveyor belt in an easy safe, convenient and fast manner.

Other example implementations of the invention will be described in the following with reference to the figures. It has to be noted that the figures are only provided for illustration of the general concept of the invention by examples not defining the scope of protection of the invention. The figures are not drawn to scale. Features shall not be considered to be essential for the present invention because they are depicted in the figures.

BRIEF DESCRIPTION OF THE FIGURES

In the figures

DETAILED DESCRIPTION OF THE FIGURES

Figure 1:
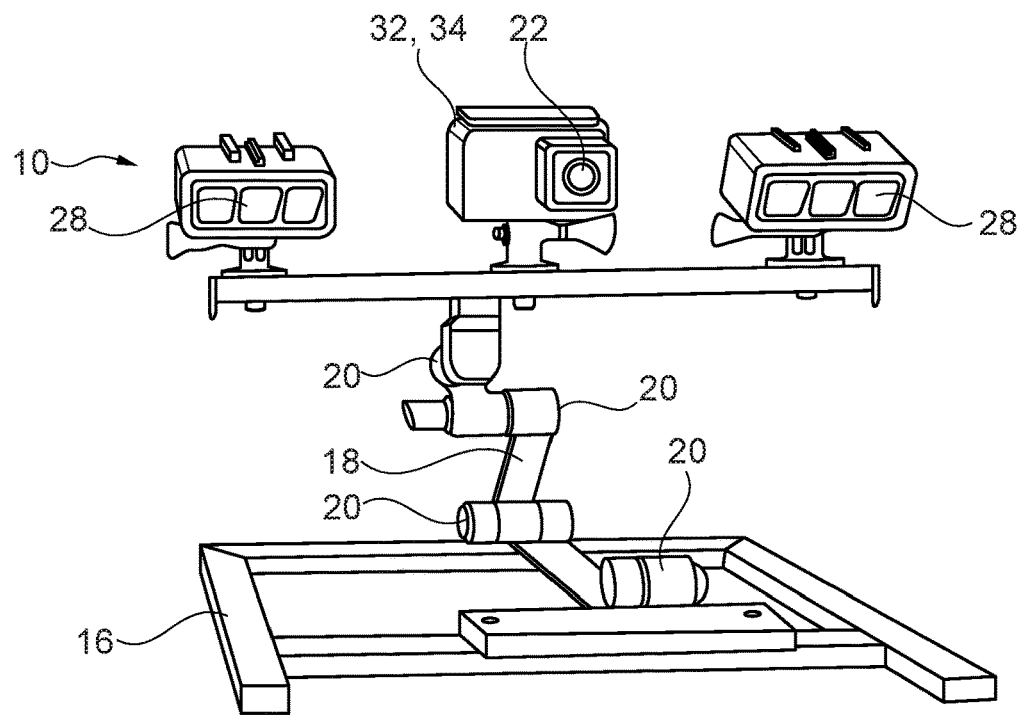
FIG. 1 shows an exemplary implementation of a camera as part of an inspection system, according to the invention in a perspective view.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
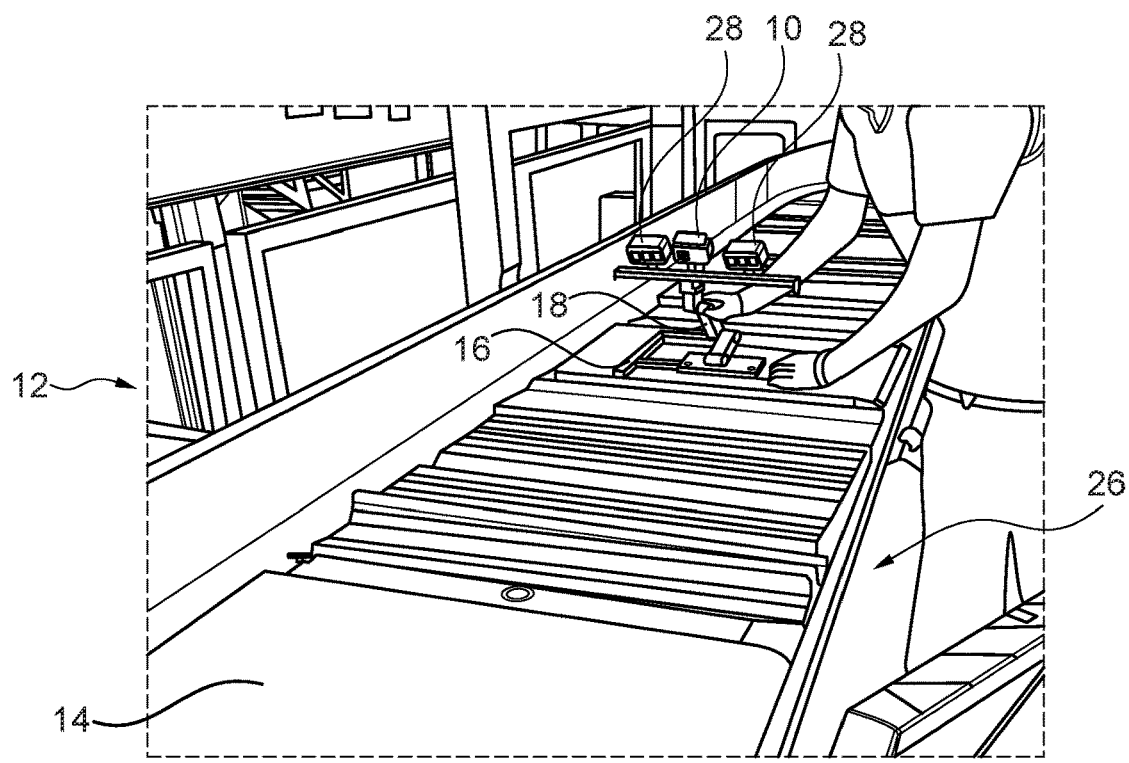
FIG. 2 shows an exemplary implementation of the inspection system for locating a lost object fallen from a conveyor belt, according to the invention in a schematic perspective view.

The invention will be described in the following with reference to exemplary implementations showing in FIG. 1 a first implementation of the camera 10 as part of the inspection system 12 which is shown in FIG. 2. The camera 10 is configured for being arranged on the conveyor belt 14. Therefore the camera 10 includes a rig 16 for stationary arranging the camera 10 on the conveyor belt 14. In this implementation, the rig 16 has a rectangular form and is made out of metal. Furthermore, the camera 10 includes a length adjustable and pivotable arm 18 for adjusting the field of view of the camera 10. FIG. 1 shows that the arm 18 has four hinges 20, which allow positioning a lens 22 of the camera 10 in an elevated position. Furthermore, the hinges 20 allow for pivoting the lens 22. The camera 10 is configured for capturing an image 24 of a surrounding 26 of the conveyor belt 14, while being moved by the conveyor belt 14. In order to enhance the quality of the captured image 24, the camera 10 includes at least one lighting or light emitter 28. In this implementation, the camera 10 includes two lightings 28, which are arranged on each side of the lens 20. Furthermore, the camera 10 is configured for transmitting the captured image 24 to a data processing device 30. On this account, the camera 10 includes a wireless transmitter 32. Furthermore, the camera 10 is configured to determine the position, where the image 24 was captured. Therefore, the camera 10 includes a receiver 34 for an indoor navigation system. By using the wireless transmitter 32, the camera 10 not only transmits the captured image 24 to the data processing device 30 but also the determined position.

FIG. 2 shows an exemplary implementation of the inspection system 12 for locating a lost object 36 fallen from the conveyor belt 14, according to the invention in a schematic perspective view. The inspection system 12 includes the camera 10 (also shown in FIG. 1), the conveyor belt 14 and the data processing device 30 (shown in FIG. 4). The conveyor belt 14 is configured for moving the object 36 placed on the conveyor belt 14. Since the object 36 is lost, it is not located on the conveyor belt 14. For moving the object 36, the conveyor belt 14 includes a motor (not shown). As shown in FIG. 2, the camera 10 is arranged on the conveyor belt 14. When the conveyor belt 14 starts moving, the camera 10 is moved by the conveyor belt 14 and captures images 24 of the surrounding 26 of the conveyor belt 14. The arm 18 of the camera 10 allows pivoting the camera 10. The lens 22 of the camera 10 may be positioned elevated above the conveyor belt 14 at a specific angel to the conveyor belt 14 in order to capture the surrounding 26 of the conveyor belt 14 that is beside and below the conveyor belt 14.

Figure 3:
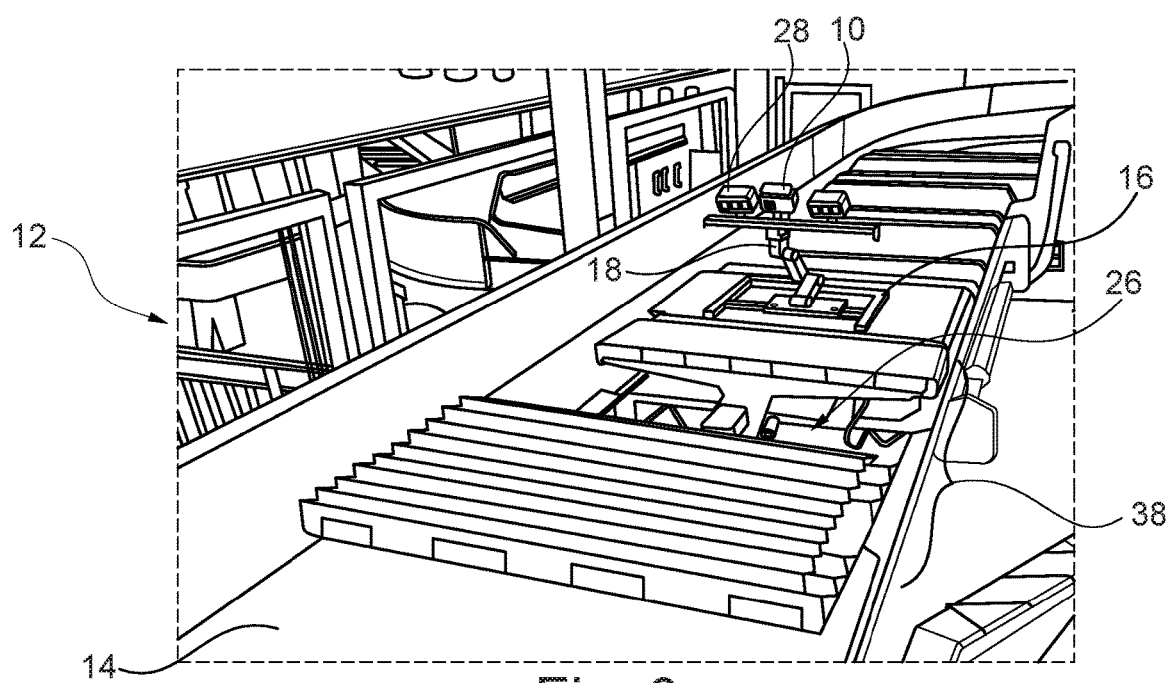
FIG. 3 shows another exemplary implementation of the inspection system for locating the lost object fallen from the conveyor belt, according to the invention in a schematic perspective view.

FIG. 3 shows another exemplary implementation of the inspection system 12 for locating the lost object 36 fallen from the conveyor belt 14 according to the invention in a schematic perspective view. In this implementation, the conveyor belt 14 includes a removable section 38. The conveyor belt 14 is configured such that the section 38 of the conveyor belt 14 is removable without diminishing the ability of the conveyor belt 14 to move. As shown in FIG. 3, the section 38 of the conveyor belt 14 can be folded aside parallel to the direction of movement of the conveyor belt 14. The camera 10 is arranged on the conveyor belt 14 next to the removable section 38. By removing the removable section 38 of the conveyor belt 14, a part of the surrounding 26, which was hidden by the conveyor belt 14 before removing the removable section 38, becomes visible for the camera 10. The part of the surrounding 26 that is below the conveyor belt 14 is therefore visible to the camera 10.

When the conveyor belt 14 starts moving, the camera 10 is moved by the conveyor belt 14 and captures images 24 of the surrounding 26, including the part visible through the removed section 38 of the conveyor belt 14.

Figure 4:
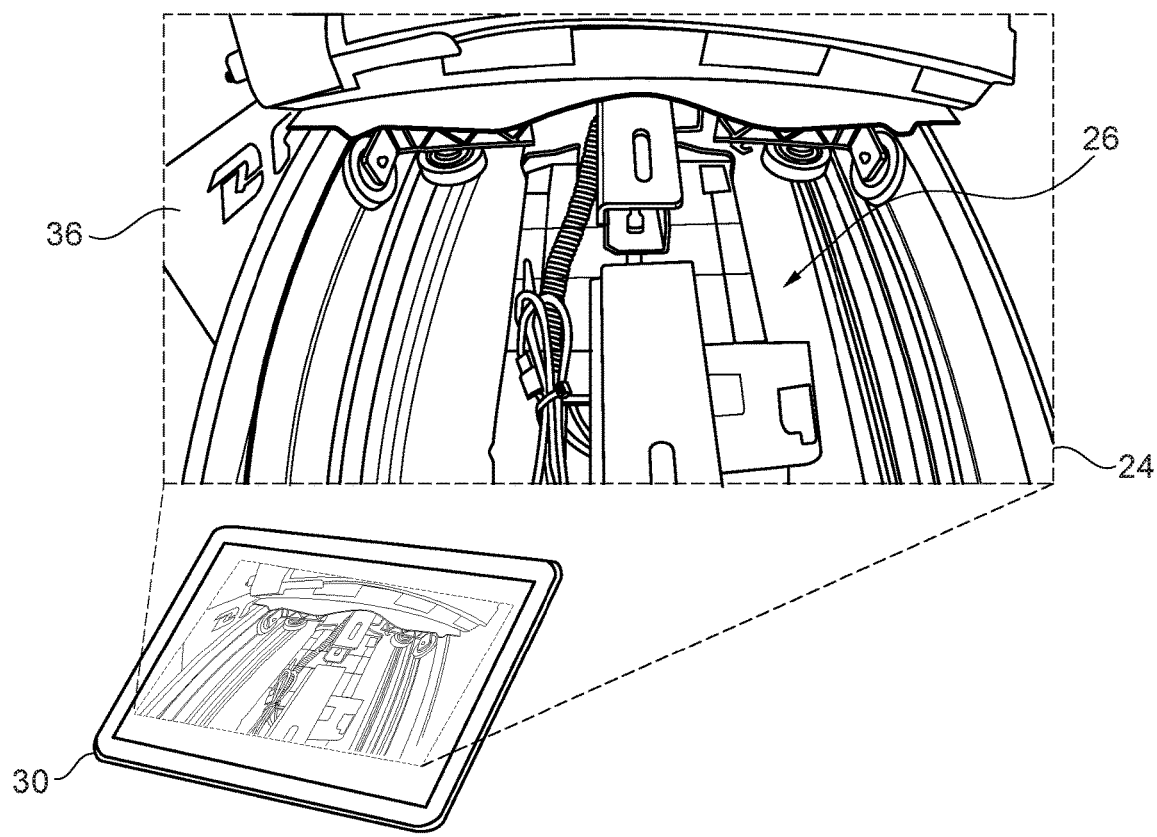
FIG. 4 shows an exemplary implementation of a data processing device as part of the inspection system as wells as an exemplary image captured by the camera, according to the invention in a perspective view.

FIG. 4 shows an exemplary implementation of the data processing device 30 as part of the inspection system 12 as wells as an exemplary image 24 captured by the camera 10. The camera 10 has transmitted the captured image 24 to the data processing device 30 for recognizing the lost object 36 in the transmitted image 24. In this implementation, the object 36 is a flyer bag 36 and the data processing device 30 is a tablet computer 30. On the screen of the tablet computer 30 the captured image 24 is displayed. The image 24 shows the surrounding 26 of the conveyor belt 14. Especially the surrounding 26 that is visible to the camera 10 through the removed section 38 of the conveyor belt 14 is visible on the image 24. In this example, the flyer bag 36 has fallen from the conveyor belt 14 and has landed below the conveyor belt 14 on its right side. Only by removing the removable section 38, the location of the flyer bag 36 and the flyer bag 36 itself became visible to the camera 10. The data processing device 30 automatically recognizes the lost object 36, in this case the flyer bag 36, in the transmitted image 24 by using artificial intelligence. The data processing device 30 generates status information for the lost object 36 based on the transmitted image 24 and on the determined position where the image 24 was captured.

Figure 5:
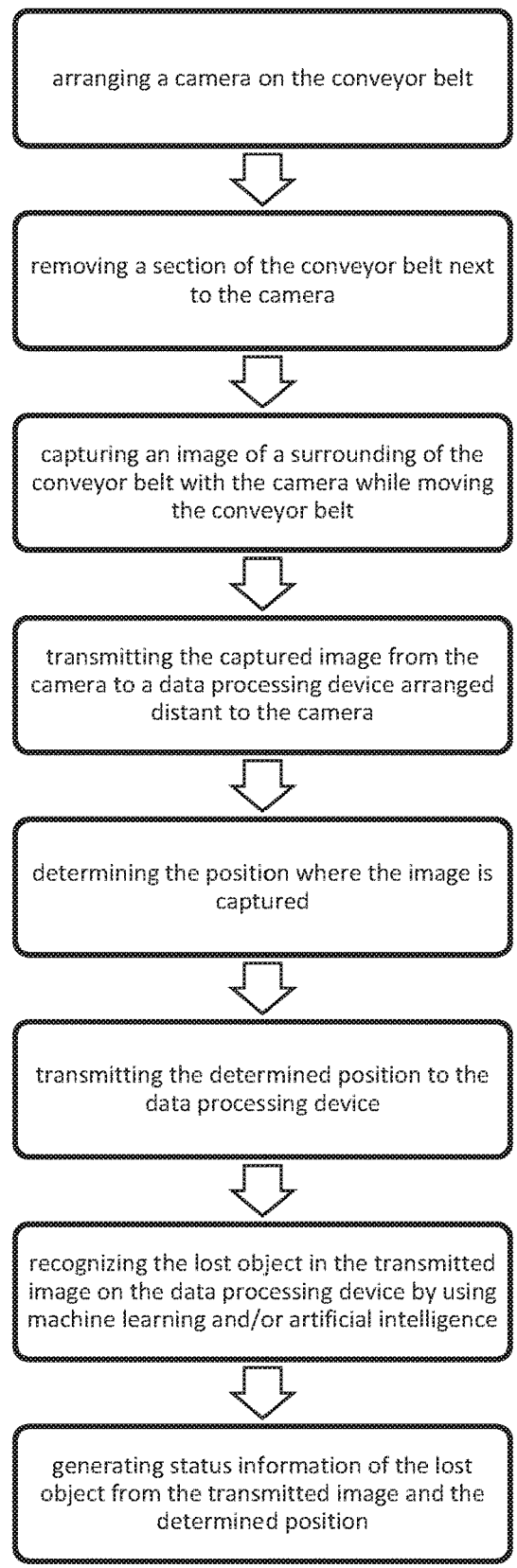
FIG. 5 shows an exemplary implementation of a method for locating the lost object according to the invention as a flow chart.

FIG. 5 shows an exemplary implementation of a method for locating the lost object 36 according to the invention as a flow chart. In this implementation the method includes eight steps: in a first step, the camera 10 is arranged on the conveyor belt 14. The result of this step is also illustrated in FIG. 2. In a further step of the method, the removable section 38 of the conveyor belt 14 next to the camera 10 is removed. The result of this step is also shown in FIG. 3. After these preparatory acts, the conveyor belt 14 is brought into movement. In a further step of the method, the image 24 of the surrounding 26 of the conveyor belt 14 is captured with the camera 10, while moving the conveyor belt 14. The surrounding 26 includes the surrounding 26 visible by the camera 10 through the removed section 38. An exemplary captured image 24 is shown in FIG. 4. In the next step of the method, the captured image 24 is transmitted from the camera to the data processing device 30. Furthermore, the position where the image 24 was captured is determined. In a further step of the method, this determined position is also transmitted to the data processing device 30. The method further includes the step of recognizing the lost object 36 in the transmitted image 24 by using machine learning and/or artificial intelligence. In a next step of the method, the data processing device 30 generates status information about the lost object 36 from the transmitted image 24 and the determined position.

Depicted or described connections between components are generally to be understood to be functional connections. They can be implemented as direct links or as indirect links via several other components. The order of presented actions is not mandatory; alternative orders are possible. Actions can be implemented in different ways. They could be implemented in software using program instructions; or they could be implemented in hardware; or they could be implemented making use of a combination of hardware and software. It is to be understood that the described implementations are examples only, which may be modified and/or supplemented in many ways within the scope of the claims. In particular, any feature described for a particular implementation can be used by itself or in combination with other features in any other implementation. Each feature that has been described for an implementation of a particular category can also be used in an equivalent manner in an implementation of any other category.

Modifications and variations can be made to the embodiments illustrated or described here in without departing from the scope and spirit of the invention as set forth in the appended claims.

REFERENCE NUMERALS camera 10
inspection system 12
conveyor belt 14
rig 16
arm 18
hinge 20
lens 22
image 24
surrounding 26
lighting 28
data processing device 30
wireless transmitter 32
receiver for indoor navigation system 34
object 36
removable section 38

The invention claimed is:

1. An inspection system for locating a lost object fallen from a conveyor belt, comprising:
   a conveyor belt configured for moving an object placed on the conveyor belt;
   a camera configured for being arranged on the conveyor belt, the camera configured for capturing an image of a surrounding of the conveyor belt while being moved by the conveyor belt; and
   a data processing device,
   wherein the camera is configured for transmitting the captured image to the data processing device that is configured for recognizing the lost object in the transmitted image, and
   wherein the conveyor belt comprises a removable section, and the surrounding comprises the surrounding visible by the camera through the removed section.

2. The inspection system of claim 1, wherein the camera is configured for determining a position where the image is captured and for transmitting the determined position to the data processing device.

3. The inspection system of claim 1, wherein the data processing device is configured for one or both of: (1) automatically recognizing the lost object in the transmitted image; and (2) recognizing the lost object by using machine learning, artificial intelligence or both machine learning and artificial intelligence.

4. The inspection system of claim 1, wherein the data processing device is configured for generating status information about the lost object from the transmitted image, a determined position, or both the transmitted image and the determined position.

5. The inspection system of claim 1, wherein the camera comprises at least one light emitter.

6. The inspection system of claim 1, wherein the camera comprises a rig for stationary arranging the camera on the conveyor belt.

7. The inspection system of claim 1, wherein the camera comprises a length adjustable arm, a pivotable arm, or a length adjustable and pivotable arm for adjusting a field of view of the camera.

8. An inspection system for locating a lost object fallen from a conveyor belt, comprising:
   a conveyor belt configured for moving an object placed on the conveyor belt, the conveyor belt comprising a removable section;
   a camera configured for being arranged on the conveyor belt, the camera configured for capturing an image of a surrounding of the conveyor belt while being moved by the conveyor belt, the camera configured for determining a position where the image is captured; and
   a data processing device,
   wherein the camera is configured for transmitting the captured image and the determined position to the data processing device that is configured for recognizing the lost object in the transmitted image,
   wherein the surrounding comprises the surrounding visible by the camera through the removed section, and
   wherein the data processing device is configured for generating status information about the lost object from the transmitted image, the determined position, or both the transmitted image and the determined position.

9. A method for locating a lost object fallen from a conveyor belt, comprising:
- arranging a camera on the conveyor belt;
- removing a section of the conveyor belt next to the camera;
- capturing an image of a surrounding of the conveyor belt with the camera while moving the conveyor belt, the surrounding comprising the surrounding visible by the camera through the removed section;
- transmitting the captured image from the camera to a data processing device arranged distant to the camera; and
- recognizing the lost object in the transmitted image on the data processing device.

10. The method of claim 9, further comprising:
determining a position where the image is captured; and
transmitting the determined position to the data processing device.

11. The method of claim 9, wherein the data processing device recognizes the lost object using machine learning, artificial intelligence, or both machine learning and artificial intelligence.

12. The method of claim 9, further comprising generating status information about the lost object from the transmitted image, a determined position, or both the transmitted image and the determined position.

* * * * *